MEANS FOR REGULATING COOLANT FLOW

Filed Dec. 28, 1965 2 Sheets-Sheet 1

INVENTOR
PAUL G. SALERNO

BY [signature]

ATTORNEYS

Jan. 2, 1968 P. G. SALERNO 3,361,348

MEANS FOR REGULATING COOLANT FLOW

Filed Dec. 28, 1965 2 Sheets-Sheet 2

INVENTOR
PAUL G. SALERNO

BY [signature]

ATTORNEYS 3,361,348
MEANS FOR REGULATING COOLANT FLOW
Paul G. Salerno, Glenview, Ill., assignor to Vapor Corporation, Chicago, Ill., a corporation of Delaware
Filed Dec. 28, 1965, Ser. No. 516,916
7 Claims. (Cl. 236—68)

This invention generally relates to cooling apparatus and more particularly relates to cooling apparatus for regulating coolant flow through an area having heat generated therein.

In certain applications it is desired to limit the maximum temperature rise of a restricted area by passing a minimum possible amount of fluid coolant therethrough. Such a situation exists in jet aircraft wherein a large quantity of electronic components is housed in a compartment. Heretofore, the cooling method generally used has been to cause air to flow through the electronic compartment so that under all conditions the cooling capacity of the air passed therethrough is sufficient to remove the heat generated within the compartment. As will be hereinafter more completely considered, the cooling capacity of air is not only a function of its temperature but of its density and velocity as well (hereinafter referred to as mass flow). Since jet aircraft will generally be flown through atmospheres having great variations in density as well as temperature, cooling systems of the type previously described will under most conditions pass an excess of air through the electronic compartment. Such a procedure is disadvantageous because in the operation of jet propelled aircraft, air is used for the combustion of fuel, and hence the conservation of air is an important consideration especially at rarified atmospheres. Thus, generally available cooling systems have been unsatisfactory since under most conditions an excess amount of air is diverted for the cooling of electronic components.

A main object of this invention is to provide an improved cooling apparatus. A more particular object is to provide a cooling apparatus responsive to the cooling capacity of the air passing therethrough. A still more particular object of this invention is to provide a cooling apparatus wherein the supply of air provided for cooling is maintained at an amount which will satisfy the cooling requirements of the system for which it is used. A still more particular object is to provide a cooling apparatus having an improved sensor for sensing the cooling capacity of the air flowing through the cooling apparatus.

Other objects and advantages of this invention will become apparent through reference to the following description and accompanying drawings which show an illustrative embodiment of this invention, in which.

Figure 1:
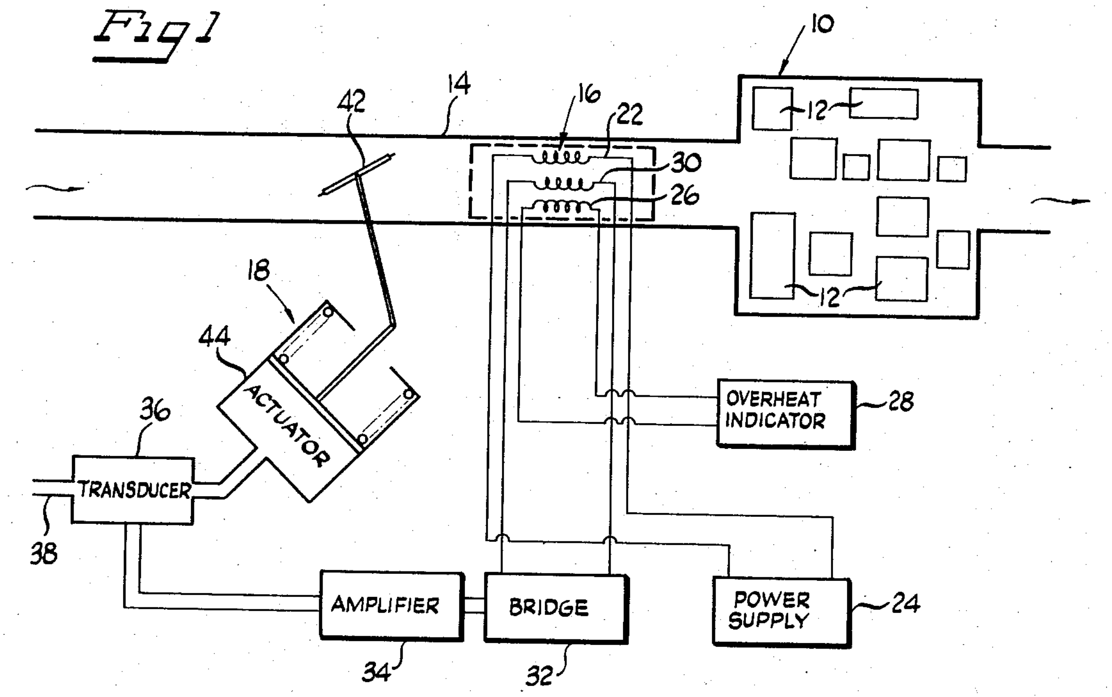
FIGURE 1 is a diagrammatic illustration of cooling apparatus embodying certain features of this invention.

Briefly, the cooling apparatus illustrated in FIGURE 1 provides a controlled quantity of cooling fluid to a compartment 10 which houses heat generating equipment 12, such as electronic equipment. The cooling fluid is supplied through a conduit 14 to the compartment. A sensing means 16 is provided in the conduit for sensing the cooling capacity of the fluid. The sensing means 16 actuates a control means 18 which regulates the amount of fluid passing through the conduit 14 so as to maintain the cooling capacity thereof constant.

As previously mentioned the cooling capacity of a fluid such as air is a function of its temperature and mass flow. For purposes of discussion, it will be assumed that it is desired to provide air cooling for an area such as a compartment containing heat generating electronic equipment. It is well known that the amount of heat absorbed (Q) by the coolant passing through the compartment is equal to the mass flow of coolant (W lbs./min.) multiplied by the coolant's specific heat ($C_p$), multiplied by the temperature change in the coolant as it passes through the compartment. In mathematical terms the relation is expressed by the following equation:

$$Q=C_pW(T_{out}-T_{in})$$

In one typical compartment, heat is generated at a rate of approximately 480 B.t.u./minute, and for adequate heat dissipation, it is required that the outlet temperature be maintained at 160° F. Substituting these typical parameters and the specific heat for air into the preceding equation the following relationship is obtained:

$$W=\frac{480}{.24\ (160-T_{in})}$$

Figure 2:
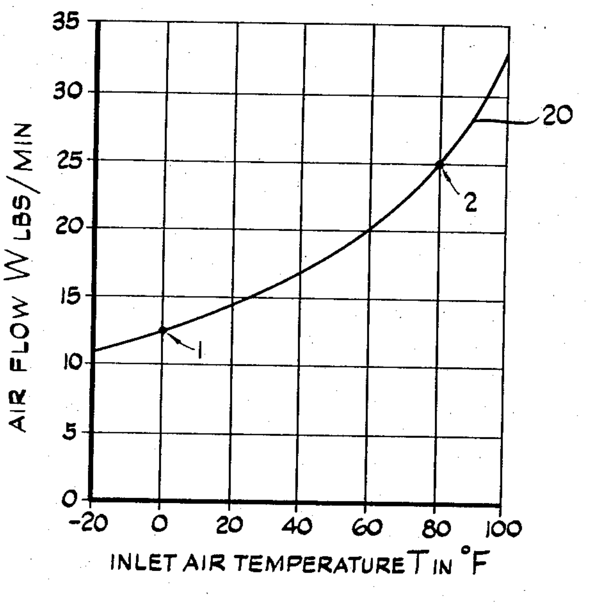
FIGURE 2 is a graphical illustration of the cooling characteristics of air on the heat producing equipment contained in the compartment shown in FIGURE 1.

The relationship between the mass flow (W) of air passing through such a compartment and its inlet temperature ($T_{in}$) is illustrated by curve 20 of FIGURE 2. From this graph it can be seen that as the inlet temperature ($T_{in}$) decreases, the mass flow of coolant (W) which must be passed through the compartment decreases. If the mass flow at a certain temperature is above the line, too much air is being used. On the other hand, if the mass flow at a certain temperature is below the line, too little air is being used. Thus, if it is desired to conserve coolant, the cooling system should be operated along the curve 20 of FIGURE 2. It should be noted that the particular requirements of the compartment under consideration will determine the curve along which the cooling system should operate for maximum efficiency.

Referring to FIGURE 1, the cooling apparatus illustrated is connected to the compartment 10 having a plurality of electronic components 12 therein. The electronic components are cooled by passing thereover coolant fluid in the form of air in the direction illustrated by the arrows. The coolant fluid is supplied to the compartment 10 by the conduit 14.

Serving to sense the cooling capacity of the coolant flowing through the conduit 14 is the sensing means 16 which, in the illustrated embodiment, includes a heating means in the form of a heater winding 22 of electrically resistive material. The heater winding 22 is connected to a suitable power supply 24 which supplies power for heating the winding 22. Spatially positioned from the heater winding 22 and thermally coupled thereto is an overheat winding 26 which includes a plurality of turns of electrically resistive, temperature sensitive material. The overheat winding 26 is connected to an overheat indicator 28, which may be the conventional type that serves to supply a suitable indication when the heat coupled to the overheat winding 26 from the heater winding 22 exceeds a predetermined value. Spatially positioned from the heater winding 22 and thermally coupled thereto is a heat sensitive element in the form of a sensing winding 30 of a plurality of turns of temperature-sensitive, resistive wire. A particular embodiment of the sensing means 16 is illustrated in FIGURE 3 and will subsequently be more fully described.

The sensing winding 30 is connected in a Wheatstone bridge 32 wherein variations in the resistance of the winding 30 are detected and transmitted to a suitable high gain amplifier 34. The output of the amplifier 34 is fed into an electro-pneumatic transducer 36 which may be of the conventional type. The transducer 36 is coupled by suitable tubing 38 to a source of pressurized air (not shown).

Serving to regulate the flow of air through the conduit 14 in response to the output of the transducer 36 is the control means 18. The control means 18 comprises a gate 42 disposed in the conduit 14 and a pneumatic actuator 44, which may be of the conventional type, connected to the output of the transducer 36.

Figure 3:
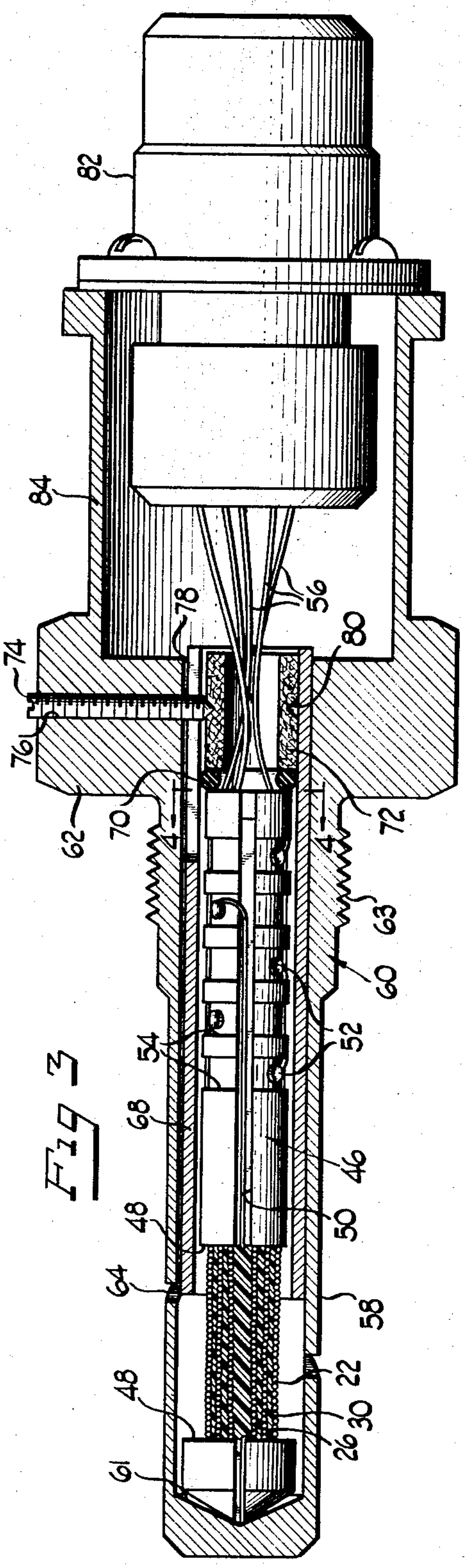
FIGURE 3 is an elevational view of a sensing element employed with the apparatus illustrated in FIGURE 1.
Figure 6:
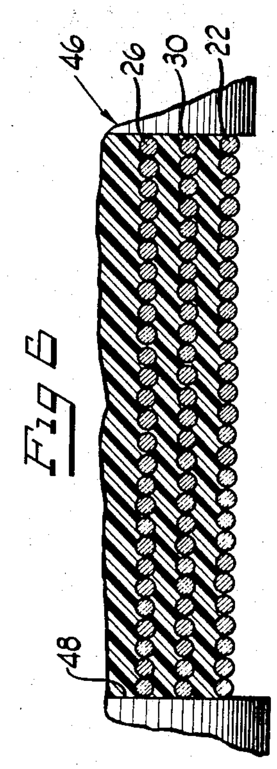
FIGURE 6 is an enlarged fragmentary view of a portion of the sensing element illustrated in FIGURE 3.

An embodiment of the sensing means 16 particularly adapted for use with the illustrated apparatus is illustrated in FIGURE 3. As illustrated the sensing winding 30, the heating winding 22, and the overheat winding 26 are wound on a support member 46 which is in the form of a rigid elongated rod of electrically insulative material. The windings 22, 26 and 30 are disposed in a circumferential recess 48 located adjacent one end of the support member 46. In this connection, as illustrated in FIGURE 6 the overheat winding 26, which may be of nickel or other resistive wire, is wound in a single layer about the support member 46 at the circumferential recess 48. Wound about the overheat winding 26 and electrically insulated therefrom by suitable means is the sensing winding 30 which comprises a plurality of turns of temperature sensitive wire such as nickel wire. The heater winding 22 which comprises a plurality of turns of resistance wire, is wound about the sensing winding 30 and is electrically insulated therefrom. Each of the winding leads is passed along one of four longitudinal equally spaced recesses 50 which are parallel to the central axis of the member 46. The ends of the winding leads are secured to solder terminals 52 embedded about the member 46 within a plurality of circumferential recesses 54. Connecting wires 56 are soldered to the terminals 52.

The support member 46 is inserted in an elongated tube portion 58 which is closed at one end, of a protective housing 60. In operation, the tube operation 58 is disposed in the conduit 14 generally transverse to the direction of flow of air. The inner end of the support member 46 is provided with a point and the inner surface of the closed end of the tubular portion 58 is provided with a mating conical recess 61 to position the inner end of the support member 46. A flange portion 62 is integrally connected to the open end of the tube portion 58. To facilitate securing the housing 60 to the walls of the conduit 14, threads 63 are cut in the outer wall of the tube portion 58 adjacent the flange portion 62 as illustrated in FIGURE 3.

Figure 5:
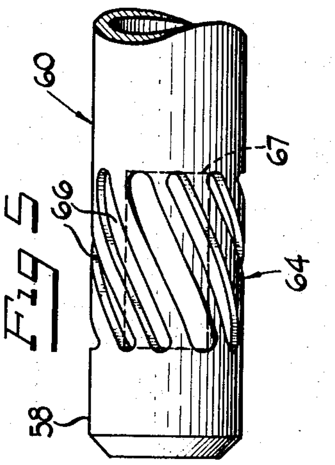
FIGURE 5 is a fragmentary plan view of a portion of the sensing element illustrated in FIGURE 3.
Figure 4:
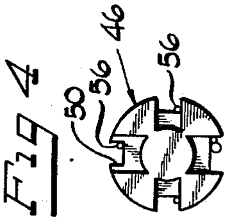
FIGURE 4 is a sectional view along the line 4—4 of FIGURE 3.

Positioned proximate the closed end of the tube portion 58 is a vent 64. The vent serves to permit fluid coolant to pass through the tube portion 58 and over the windings 26, 30 and 22. To minimize the turbulence of the air passing through the tube portion 58 and to permit complete freedom in the radial positioning of the sensing means 16 within the conduit 14, the vent 64 is in the form of a plurality of closely spaced spirally orientated, elongated slots 66 as illustrated in FIGURE 5. Preferably each slot is made of a length and disposed at an angle such as to expose the complete heater winding 22 diagonally with respect to a diametric cross section thereof (as indicated by dotted outline 67 in FIGURE 5). The spacing and width of the slots is made such that the heater winding 22 is exposed to the direct flow of air for at least the equivalent of two slots. Thus, the heater winding 22 is exposed to the essentially same flow of air no matter what its rotational orientation.

In the illustrated embodiment, means 68 are provided for adjusting the sensitivity of the sensing means 16 to the coolant capacity. By this means, all sensing means can be adjusted to have the same sensitivity, thus permitting complete interchangeability of sensing means 16. The illustrated adjusting means 68 includes a sleeve of insulating material which is inserted between the support member 46 and the tube portion 58 of the housing 60. The sleeve 68 extends beyond the outer end of the support member 46, and a packing ring 70 and a spacer sleeve 72 are disposed in the outer end of the sleeve 68. The sleeve 68 is moved axially to adjust the portion of the heater winding 22 which is exposed to the air flow thereby adjusting the sensitivity of the sensing means 16. To retain the sleeve 68 in position a set screw 74 is provided which extends through a threaded hole 76 in the flange 62 and an elongated slot 78 in the outer end of the sleeve 68 and clamps the sleeve 68 between the spacer sleeve 72 and the housing 60. A circumferential groove 80 is provided in the spacer sleeve for receiving the end of the set screw 74 to prevent longitudinal movement of the spacer sleeve 72 relative to the housing 60.

In the illustrated embodiment, an electrical connector 82 is suitably mounted to a tubular extension 84 of the housing 60. The outer ends of the connecting wires 56 are suitably connected to respective electrical terminals (not shown) in the electrical connector 82.

As previously mentioned the cooling apparatus of FIGURE 1 is particularly adapted for cooling the electric component compartment of a jet aircraft and for purposes of discussion it will be assumed that the cooling requirement of the compartment 10 corresponds with the curve 20 of FIGURE 2. As previously mentioned in reference to FIGURE 2, it is desired to pass the minimum mass flow of air under all conditions through the compartment 10 while still maintaining adequate cooling therein. To provide such a mass flow of air, the sensing means 16 is constructed to sense both temperature and mass flow. This is accomplished in the illustrated embodiment by making the sensing means 16 an analog of the thermal characteristics of the electronic components in the compartment 10. To obtain such an analog relationship the power per unit area supplied to the heater winding 22 and the temperature of the sensing winding 30 are selected so that the temperature measured by, and hence the resistance of, the sensing winding remains constant for any combination of mass flow and inlet temperature lying along the curve. In other words, any mass of air flow and its corresponding inlet temperature as indicated by the cooling characteristic curve of the compartment to be cooled, reduces the temperature of the heater winding by the same amount. The specific operating temperature of the sensing winding 30 and the specific power per unit area supplied to the heater winding 22 depend upon the cooling characteristic curve of the compartment. Once the curve is established the power density of the heater winding 22 and the operating temperature of the sensing winding 30 may be selected by experimentation.

The temperature of the sensing winding can also be determined mathematically by employing the following formula:

$$t_s=\frac{t_1-\left(\frac{W_2}{W_1}\right)^m\left(\frac{\mu_2}{\mu_1}\right)^{1-m}t_2}{1-\left(\frac{W_2}{W_1}\right)^m\left(\frac{\mu_2}{\mu_1}\right)^{1-m}}$$

The above formula is derived from empirical data found in textbooks on heat-transfer under the subject of "heated cylinders in cross-flow" where values of the empirical exponent "$m$" can be found. One such textbook is "Heat and Mass Transfer" by Eckert and Drake, McGraw-Hill, Inc., 1959 pp. 241 and 242. The symbols used in the equation are defined as follows:

$t_s$=temperature of sensing winding, deg. F.
$W$=weight flow of cooling air, lb./min.
$t$=temperature of cooling air, deg. F.
$\mu$=viscosity of cooling air, lbs./(ft.)(sec.)
$m$=empircal number Subscripts 1 and 2 refer to any two points on the cooling characteristic curve. Any two points may be chosen, but they are best spaced at some distance apart as shown in FIGURE 2, for example.

In operation, if excessive coolant passes through the conduit 14, the temperature of the heater winding 22 and hence of the sensing winding 30 are reduced below their desired operating temperature. The accompanying reduction in resistance of the sensing winding 30 unbalances the bridge 32. The unbalance in the bridge 32 is amplified by the amplifier 34 and is converted into a corresponding change in pneumatic pressure at transducer 36. The change in pneumatic pressure causes a corresponding change in the position of the valve 44, and thus the gate 42. The gate 42 is moved so as to reduce the flow of coolant a sufficient amount to rebalance the bridge 32.

Although but one specific embodiment of this invention has been shown and described, it will be understood that various modifications may be made without departing from the spirit or scope of this invention. Various features of the invention are set forth in the accompanying claims.

What is claimed is:

1. A cooling apparatus comprising an inlet conduit for directing a flow of fluid coolant which varies in temperature and mass flow to a restricted area having equipment therein which generates heat, sensing means comprising a support member positioned within said conduit in communication with said fluid coolant, a cylindrical heating winding on said member, a cylindrical sensing winding on said member in coaxial relationship with said heating winding and thermally coupled to said heating winding, a source of electrical current coupled to said heating winding so that when current is passed through said heating winding the sensing winding is heated to a preselected operating temperature and is cooled at a rate directly related to the cooling capacity of the coolant on the equipment, a tubular housing coaxially disposed about said windings, the walls of said housing adjacent said sensing winding being provided with a plurality of slots to permit the passage of coolant over said sensing winding, said slots being at an angle to the axes of the winding, means sensing the resistance of said sensing winding, a transducer responsive to said resistance sensing means, and means in said conduit for controlling the flow of fluid therethrough, said controlling means being connected to said transducer and responsive to the output of said transducer so as to maintain the temperature rise of the equipment at a relatively constant predetermined value.

2. A cooling apparatus as set forth in claim 1 in which an adjusting means is provided for adjusting the amount of the sensing winding exposed to fluid flow.

3. A cooling apparatus as set forth in claim 2 in which said adjusting means comprises a sleeve positioned between said support member and said housing and slidably movable relative thereto to adjust the amount of the sensing winding which is exposed to the fluid flow, and a locking means for locking the relative position of said sleeve.

4. A cooling apparatus comprising an inlet conduit for directing a fluid coolant which varies in temperature and mass flow to a restricted area having equipment therein which generates a predetermined amount of heat, an outlet conduit providing an outlet for said coolant from said area, sensing means including a heating winding and a sensing winding of temperature-sensitive, resistive wire thermally coupled to said heating winding, said sensing winding being positioned in said inlet conduit in communcation with the flow of said coolant, a power supply for supplying a constant preselected power per unit area to said heating winding thereby heating said sensing winding to a preselected normal operating temperature, and means for sensing the resistance of said sensing winding and providing an output related to the resistance changes of said sensing winding, the preselected power per unit area of said heating winding and the preselected operating temperature of said sensing winding being selected so that said predetermined amount of generated heat is absorbed by said coolant and the temperature of the coolant in said outlet conduit remains relatively constant, a transducer responsive to output of said resistance sensing means, and means in said inlet conduit for controlling the flow of fluid therethrough, said controlling means being responsive to operation of said transducer.

5. The cooling apparatus set forth in claim 4 which further includes a resistance bridge for sensing the resistance of said sensing winding and providing an output related to the resistance change of said sensing winding, and an amplifier for amplifying the output of said bridge, the output of said amplifier being connected to said transducer for control thereof.

6. A cooling apparatus as set forth in claim 4 in which an adjusting means is provided for adjusting the amount of the sensing winding exposed to fluid flow.

7. A cooling apparatus as set forth in claim 6 in which said sensing winding is cylindrical, and said adjusting means comprises a sleeve coaxially disposed about said sensing winding and slidably movable relative thereto to adjust the amount of the sensing winding which is exposed to the fluid flow, and a locking means for locking the relative position of said sleeve.

References Cited

UNITED STATES PATENTS

| | | | |
|---|---|---|---|
| 2,553,060 | 5/1951 | Miner | 236—68 |
| 2,556,973 | 6/1951 | Nickells | 236—68 |
| 2,923,759 | 2/1960 | Swan | 236—68 |
| 3,227,858 | 1/1966 | Rees | 236—68 |

MEYER PERLIN, *Primary Examiner.*